US012381030B2

(12) United States Patent
Wada et al.

(10) Patent No.: US 12,381,030 B2
(45) Date of Patent: Aug. 5, 2025

(54) COIL COMPONENT

(71) Applicant: Murata Manufacturing Co., Ltd., Kyoto-fu (JP)

(72) Inventors: Tomoyuki Wada, Nagaokakyo (JP); Kazuto Shibuya, Nagaokakyo (JP); Seiya Yuki, Nagaokakyo (JP); Yuki Kanbe, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 893 days.

(21) Appl. No.: 17/499,801

(22) Filed: Oct. 12, 2021

(65) Prior Publication Data

US 2022/0130597 A1 Apr. 28, 2022

(30) Foreign Application Priority Data

Oct. 26, 2020 (JP) ................................ 2020-178868

(51) Int. Cl.
*H01F 17/04* (2006.01)
*H01F 27/28* (2006.01)
*H01F 27/29* (2006.01)

(52) U.S. Cl.
CPC ....... *H01F 27/2828* (2013.01); *H01F 17/045* (2013.01); *H01F 27/292* (2013.01)

(58) Field of Classification Search
CPC .... H01F 27/2828; H01F 17/045; H01F 27/29; H01F 27/292; H01F 27/2823; H01F 17/04; H01F 27/24
USPC .................................................... 336/83, 192
See application file for complete search history.

(56) References Cited

U.S. PATENT DOCUMENTS

2005/0237141 A1* 10/2005 Hirai ..................... H01F 27/292 336/83
2015/0042434 A1* 2/2015 Bando ................... H01F 27/292 242/613.3
2015/0162126 A1* 6/2015 Kanbe ................. H01F 27/2823 29/605
2022/0037081 A1* 2/2022 Nakamura .......... H01F 27/2828

FOREIGN PATENT DOCUMENTS

CN 104347236 A 2/2015
JP 2000208331 A * 7/2000 ........... H01F 17/045
JP 2003-151837 A 5/2003
JP 2004274038 A * 9/2004

(Continued)

*Primary Examiner* — Tszfung J Chan
(74) *Attorney, Agent, or Firm* — Studebaker Brackett PLLC

(57) ABSTRACT

A coil component includes a core that has a columnar winding core portion and a flange formed at an end of the winding core portion in an axial direction. The coil component also includes a terminal electrode formed at an end surface of the flange and a wire being wound around the winding core portion with one end portion coupled to the terminal electrode. The flange protrudes toward the first end of the coil component in the first direction. A curved surface and an inclined surface are formed at a boundary between a surface of the flange and a peripheral surface of the winding core portion. The inclined surface has a curvature smaller than that of the curved surface. In addition, the inclined surface is disposed where the wire intersects the boundary as viewed in the first direction.

20 Claims, 3 Drawing Sheets

(56) References Cited

FOREIGN PATENT DOCUMENTS

| | | | |
|---|---|---|---|
| JP | 2008-294472 | A | 12/2008 |
| JP | 2015-032761 | A | 2/2015 |
| JP | 2019-110212 | A | 7/2019 |

* cited by examiner

COIL COMPONENT

CROSS-REFERENCE TO RELATED APPLICATION

This application claims benefit of priority to Japanese Patent Application No. 2020-178868, filed Oct. 26, 2020, the entire content of which is incorporated herein by reference.

BACKGROUND

Technical Field

The present disclosure relates to a coil component.

Background Art

A coil component described in Japanese Unexamined Patent Application Publication No. 2003-151837 includes a columnar winding core portion. Flanges are disposed at respective ends of the winding core portion in the axial direction thereof. Each flange protrudes outward in the first direction extending perpendicular to the axial direction. A terminal electrode is formed at a surface of each flange that is positioned closer to a first end of the coil component in the first direction.

A wire is wound around the winding core portion. One end of the wire is coupled to the terminal electrode of one of the flanges. The other end of the wire is coupled to the terminal electrode of the other flange.

In the coil component described in Japanese Unexamined Patent Application Publication No. 2003-151837, an inclined surface is formed at the boundary between the winding core portion and each flange. The inclined surface inclines relative to both the axial direction and the first direction. More specifically, in the coil component described in Japanese Unexamined Patent Application Publication No. 2003-151837, a flat inclined surface is formed in the place of a surface of each flange that is positioned closer to the center of the coil component in the axial direction and also closer than the winding core portion to the first end of the coil component in the first direction.

In the case in which the flat inclined surface is formed at the boundary between the winding core portion and the flange as in the coil component described in Japanese Unexamined Patent Application Publication No. 2003-151837, when a load is applied to the coil component, the inclined surface may not disperse the load efficiently. This may lead to breakage or cracks or the like occurring at the boundary portion between the winding core portion and the flange when a load is applied to the coil component.

SUMMARY

According to preferred embodiments of the present disclosure, a coil component includes a core that has a columnar winding core portion and a flange formed at an end of the winding core portion in an axial direction that is a direction extending along an axis of the winding core portion. The coil component also includes a terminal electrode formed at an end surface of the flange. The end surface is positioned closer to a first end of the coil component in a first direction that is a direction extending perpendicular to the axial direction. The coil component also includes a wire being wound around the winding core portion and having one end portion coupled to the terminal electrode. The flange protrudes so as to be closer than the winding core portion to the first end of the coil component in the first direction. A curved surface and an inclined surface are formed at a boundary between a surface of the flange and a peripheral surface of the winding core portion that is positioned closer to the first end of the coil component in the first direction. The curved surface is arcuately recessed outward in the axial direction and also toward a second end of the coil component in the first direction. The inclined surface has a curvature smaller than that of the curved surface. In addition, the inclined surface is disposed where the wire intersects the boundary as viewed in the first direction.

According to the above configuration, the inclined surface having a smaller curvature is formed where the wire intersects the boundary between the winding core portion and the flange. This prevents foreign bodies or the like from readily entering a space between the inclined surface and the wire and from damaging the wire. The arcuately curved surface is disposed at a portion of the boundary between the winding core portion and the flange. When a load is applied to the core, the curved surface can disperse the load efficiently. This prevents the load from readily concentrating on the boundary between the winding core portion and the flange, which reduces the likelihood of breakage or cracks occurring in the core of the coil component.

Other features, elements, characteristics and advantages of the present disclosure will become more apparent from the following detailed description of preferred embodiments of the present disclosure with reference to the attached drawings.

DETAILED DESCRIPTION

A coil component according to an embodiment will be described with reference to the drawings.

Figure 1:
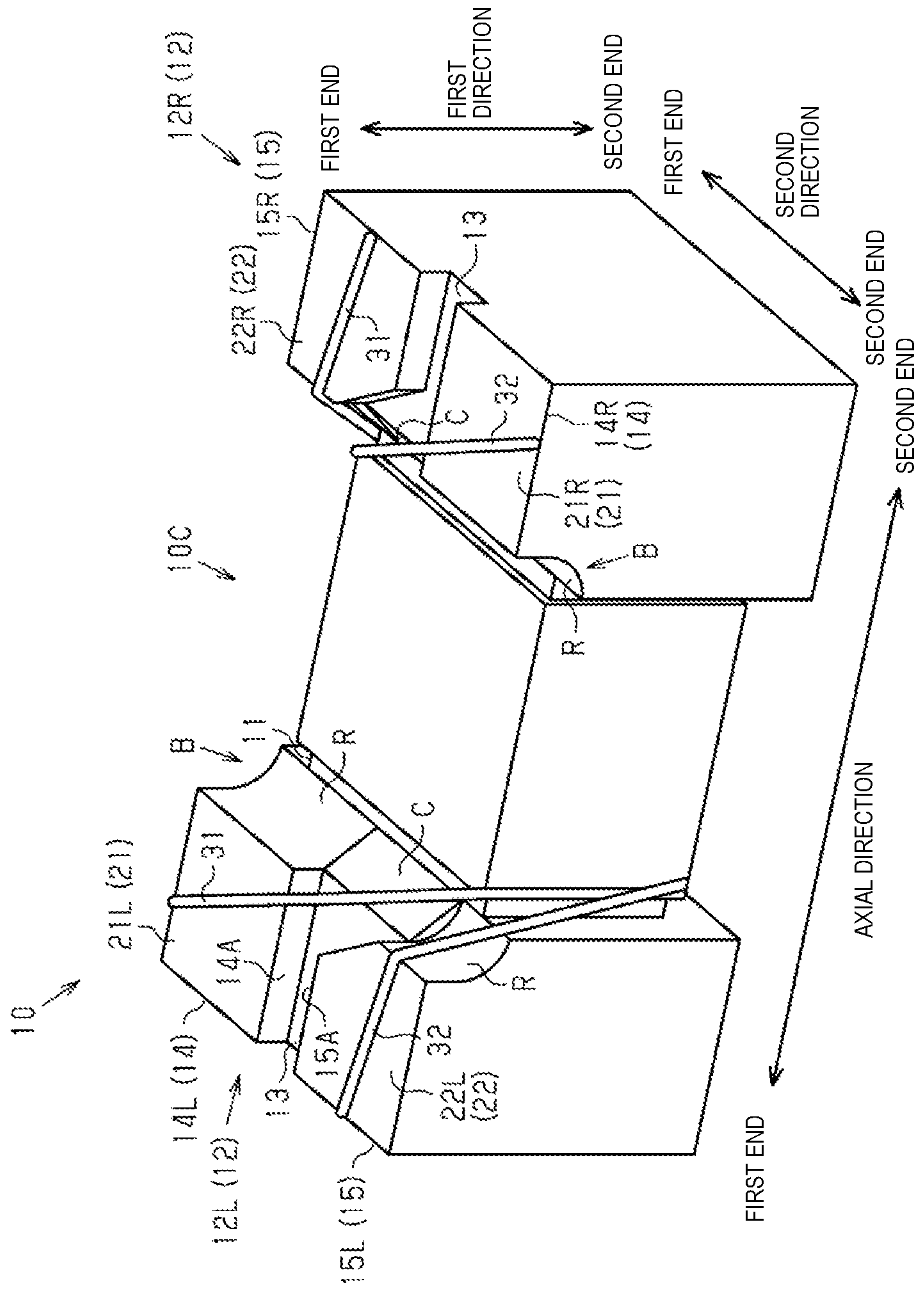
FIG. 1 is a perspective view illustrating a coil component according to an embodiment of the present disclosure.

As illustrated in FIG. 1, a coil component 10 includes a winding core portion 11 shaped like a rectangular prism. Note that a direction extending perpendicular to the axial direction of the winding core portion 11 and parallel to short sides of the rectangular cross-section of the winding core portion 11 is hereinafter referred to as the "first direction". In addition, a direction extending perpendicular to any of the axial direction and the first direction is hereinafter referred to as the "second direction".

A flange 12 is formed at an end of the winding core portion 11 near a first end of the coil component in the axial direction. The flange 12 protrudes outward from the winding core portion 11 in the first and second directions.

When the coil component is viewed in the axial direction, the flange 12 is shaped substantially like a rectangle, which is similar to the shape of the winding core portion 11. A recess 13 is formed at an end surface of the flange 12 near a first end of the coil component in the first direction. The recess 13 is positioned in the middle of the flange 12 in the second direction. Both ends of the recess 13 in the axial direction are open at respective side surface of the flange 12. Accordingly, a portion of the flange 12 near the first end of the coil component in the first direction is bifurcated by the recess 13 into two portions. Note that the bottom surface of the recess 13 is positioned closer than the peripheral surface of the winding core portion 11 to the first end of the coil component in the first direction.

One of the bifurcated portions of the flange 12 is a first leg 14. The first leg 14 is closer than the recess 13 to a first end of the coil component in the second direction. The first leg 14 protrudes to the first end of the coil component in the first direction with respect to the recess 13. The other bifurcated portion of the flange 12, which is positioned closer than the recess 13 to a second end of the coil component in the second direction, is a second leg 15 that protrudes to the first end of the coil component in the first direction relative to the recess 13. In other words, the first leg 14 and the second leg 15 are formed so as to be closer than the winding core portion 11 to the first end of the coil component in the first direction. In addition, the first leg 14 and the second leg 15 are spaced from each other in the second direction with the recess 13 interposed therebetween.

The first leg 14 is shaped like a rectangle as viewed in the first direction. Since the first leg 14 is spaced from the second leg 15 in the second direction, the first leg 14 has a first opposing surface 14A that opposes the second leg 15 in the second direction. The first opposing surface 14A extends in the axial direction.

Since the second leg 15 is spaced from the first leg 14 in the second direction, the second leg 15 has a second opposing surface 15A that opposes the first leg 14 in the second direction. When the second leg 15 is viewed in the first direction, the rectangular second leg 15 has a chamfered corner that is positioned closer both to the winding core portion 11 in the axial direction and to the axis of the winding core portion 11 in the second direction. Accordingly, the second opposing surface 15A includes a portion that extends in the axial direction and another portion that extends so as to incline relative to the axial direction and face toward the winding core portion 11.

Figure 2:
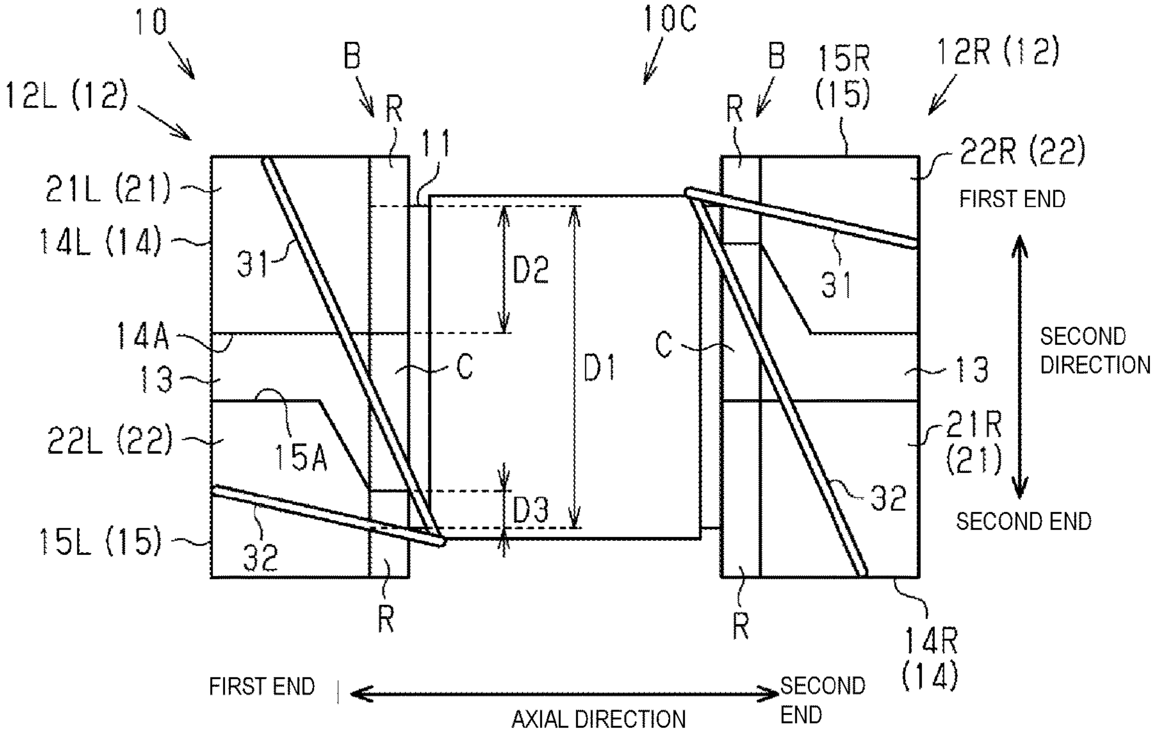
FIG. 2 is a top view illustrating the coil component.

As illustrated in FIG. 2, the portion of the second opposing surface 15A extending in the axial direction extends from an end of the second leg 15 near the first end of the coil component in the axial direction to a central portion of the second leg 15 in the axial direction. Moreover, the portion of the second opposing surface 15A extending in the axial direction is disposed parallel to the first opposing surface 14A. The other portion of the second opposing surface 15A facing toward the winding core portion 11 extends obliquely toward the second end of the coil component in the second direction at an angle of about 60 degrees from the portion of the second opposing surface 15A extending in the axial direction. The other portion of the second opposing surface 15A facing toward the winding core portion 11 has a side positioned closer to a second end of the core component in the axial direction, and the side is positioned so as to be closer in the second direction than the edge of the winding core portion 11 to the axis of the winding core portion 11.

Accordingly, at least in a portion of the first leg 14 and in a portion of the second leg 15, the distance between the first leg 14 and the second leg 15 in the second direction becomes larger as the distance from the winding core portion 11 in the axial direction becomes smaller. In the present embodiment, a portion of the second opposing surface 15A from the edge thereof positioned near the winding core portion 11 in the axial direction is formed so as to become more distant from the first opposing surface 14A as a distance from the winding core portion 11 in the axial direction becomes smaller. In other words, the distance between the first opposing surface 14A and the second opposing surface 15A in the second direction is such that the distance between the edges of respective opposing surfaces 14A and 15A positioned closer to the second end of the coil component in the axial direction is larger than the distance between the edges of respective opposing surfaces 14A and 15A positioned closer to the first end of the coil component in the axial direction.

As illustrated in FIGS. 1 and 2, a first terminal electrode 21 is laminated on an end surface of the first leg 14 of the flange 12 in the first direction. In the present embodiment, the first terminal electrode 21 is formed on the entire end surface of the first leg 14, the end surface being positioned near the first end of the coil component in the first direction. Similarly, in the flange 12, a second terminal electrode 22 is laminated on an end surface of the second leg 15 in the first direction. The second terminal electrode 22 is formed on the entire end surface of the second leg 15, the end surface being positioned near the first end of the coil component in the first direction. Note that the first terminal electrode 21 and the second terminal electrode 22 are formed as metal layers of silver with plating layers of copper, nickel, or tin.

A curved surface R is formed at a boundary B between an outer surface of the flange 12 facing the winding core portion 11 and a peripheral surface of the winding core portion 11 that is positioned closer to the first end of the coil component in the first direction. The curved surface R is recessed arcuately outward in the axial direction and also toward the second end of the coil component in the first direction. An inclined surface C having a curvature smaller than that of the curved surface R is also formed at the boundary B. The boundary B, the curved surface R, and the inclined surface C will be described further later.

A flange 12 is also formed at an end of the winding core portion 11 that is closer to the second end of the coil component in the axial direction, as is the case for the first end. When the coil component is viewed in the first direction, the flange 12 closer to the second end and the flange 12 closer to the first end are formed in point symmetry with respect to the center of the winding core portion 11. In other words, in the flange 12 formed at the second end of the coil component in the axial direction, the first leg 14 is disposed near the second end of the coil component in the second direction, and the second leg 15 is disposed near the first end of the coil component in the second direction.

The winding core portion 11 and the flanges 12 constitute a core 10C of the coil component 10. The core 10C is made of a non-conductive material. More specifically, the material of the core may include, for example, alumina, Ni—Zn based ferrite, resin, or a mixture of these.

Note that in the following description, when it is necessary to distinguish the flanges 12 from each other, the flange 12 near the first end of the coil component in the axial direction is referred to as a "first flange 12L", and the flange 12 near the second end of the coil component in the axial direction is referred to as a "second flange 12R".

Accordingly, in the first flange 12L, the first leg 14 and the second leg 15 are referred to as a "first leg 14L" and a "second leg 15L", and the first terminal electrode 21 and the second terminal electrode 22 are referred to as a "first terminal electrode 21L" and a "second terminal electrode 22L", respectively. Similarly, in the second flange 12R, the first leg 14 and the second leg 15 are referred to as a "first leg 14R" and a "second leg 15R", respectively. In addition, the terminal electrode formed at the end surface of the first leg 14R near the first end of the coil component in the first direction is referred to as a "first terminal electrode 21R". The terminal electrode formed at the end surface of the second leg 15R near the first end of the coil component in the first direction is referred to as a "second terminal electrode 22R".

As illustrated in FIGS. 1 and 2, the coil component 10 includes a first wire 31. One end of the first wire 31 is coupled to the first terminal electrode 21L of the first flange 12L.

The first wire 31 extends from the first terminal electrode 21L of the first flange 12L to the winding core portion 11, more specifically, to a position closer than the axis of the winding core portion 11 to the second end of the coil component in the second direction. In the present embodiment, the first wire 31 extends from the first terminal electrode 21L of the first flange 12L to one of four corner ridges of the winding core portion 11 that is closest to the second terminal electrode 22L of the first flange 12L. The first wire 31, which extends from this corner ridge of the winding core portion 11 to the first terminal electrode 21L of the first flange 12L, passes between the first leg 14L and the second leg 15L of the first flange 12L.

Figure 3:
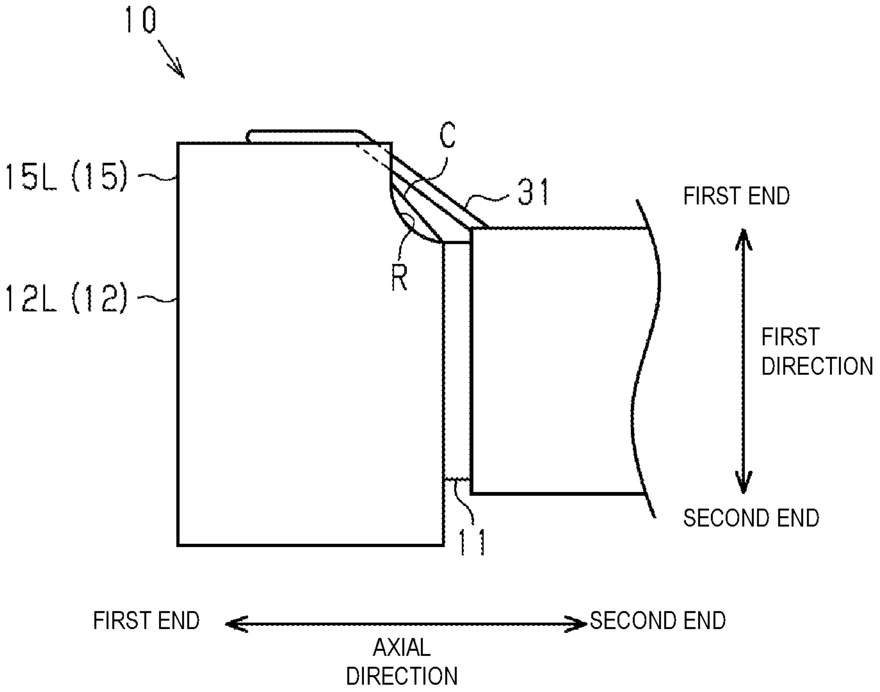
FIG. 3 is a side view illustrating part of the coil component.

The intermediate portion of the first wire 31 is wound around the winding core portion 11. When the first end of the coil component is viewed in the axial direction, the first wire 31 is wound clockwise around the winding core portion 11. Note that FIGS. 1 to 3 provide only simplified illustrations of the first wire 31 wound around the winding core portion 11.

In the vicinity of the second flange 12R of the winding core portion 11, the other end portion of the first wire 31 extends to the second terminal electrode 22R of the second flange 12R from one of the four corner ridges of the winding core portion 11 that is positioned farthest away from the first terminal electrode 21R of the second flange 12R. The other end of the first wire 31 is coupled to the second terminal electrode 22R of the second flange 12R.

The coil component 10 also includes a second wire 32. One end of the second wire 32 is coupled to the second terminal electrode 22L of the first flange 12L.

The second wire 32 extends from the second terminal electrode 22L of the first flange 12L to one of four corner ridges of the winding core portion 11 that is positioned farthest away from the first terminal electrode 21L of the first flange 12L.

The intermediate portion of the second wire 32 is wound around the winding core portion 11. When the first end of the coil component is viewed in the axial direction, the second wire 32 is wound clockwise around the winding core portion 11. Note that FIGS. 1 to 3 provide only simplified illustrations of the second wire 32 wound around the winding core portion 11.

In the vicinity of the second flange 12R of the winding core portion 11, the other end portion of the second wire 32 extends to the first terminal electrode 21R of the second flange 12R from the winding core portion 11, more specifically, from a position closer than the axis of the winding core portion 11 to the first end of the coil component in the second direction. In the present embodiment, the other end portion of the second wire 32 extends to the first terminal electrode 21R of the second flange 12R from one of four corner ridges of the winding core portion 11 that is positioned closest to the second terminal electrode 22R of the second flange 12R. The second wire 32, which extends from this corner ridge of the winding core portion 11 to the first terminal electrode 21R of the second flange 12R, passes between the first leg 14R and the second leg 15R of the second flange 12R. The other end of the second wire 32 is coupled to the first terminal electrode 21R of the second flange 12R.

Next, the boundary B between the first flange 12L and the winding core portion 11 will be described.

As illustrated in FIG. 2, the boundary B extends linearly in the second direction between the outer surface of the first flange 12L that faces the winding core portion 11 and the peripheral surface of the winding core portion 11 that is positioned closer to the first end of the coil component in the first direction. The curved surface R and the flat inclined surface C are formed at the boundary B.

The inclined surface C is formed at the boundary B so as to extend between the first leg 14L and the second leg 15L. Note that in the present embodiment, the inclined surface C is formed so as to cover the entire length of the boundary B between the first leg 14L and the second leg 15L. As described above, the first wire 31 is laid so as to extend in the second direction between the first leg 14L and the second leg 15L. In other words, as viewed in the first direction, the inclined surface C is disposed where the first wire 31 intersects the boundary B.

The inclined surface C extends from the bottom surface of the recess 13 of the first flange 12L to the peripheral surface of the winding core portion 11 that is positioned closer to the first end of the coil component in the first direction. Note that in the present embodiment, the inclined surface C is a flat surface having a curvature of zero. In other words, the curvature of the inclined surface C is configured to be smaller than that of the curved surface R.

The curved surface R is formed over the entire length of the boundary B except for the portion having the inclined surface C. More specifically, the curved surface R is formed along the boundary B at two positions near respective first and second ends of the coil component in the second direction with the inclined surface C interposed therebetween. Each curved surface R is formed so as to reach the corresponding end of the boundary B in the second direction. Note that in the present embodiment, each curved surface R extends beyond the boundary B to the portion of the first flange 12L that protrudes outward from the winding core portion 11. In the present embodiment, the curved surface R reaches the corresponding edge of the first flange 12L in the second direction.

Here, let dimension D1 be the dimension of the boundary B, in other words, the dimension of the winding core portion 11, in the second direction, as illustrated in FIG. 2. Let dimension D2 be the dimension of the curved surface R located near the first end of the coil component in the second direction along the boundary B. In addition, let dimension D3 be the dimension of the other curved surface R located near the second end of the coil component in the second direction along the boundary B. The length ratio of the total length of the two curved surfaces R to the boundary B, which is (D2+D3)/D1, is 50%. In other words, the length ratio of the curved surfaces R to the boundary B is equal to or exceeds the length ratio of the inclined surface C to the boundary B in the second direction. Note that in the present embodiment, each curved surface R extends to the edge of the first flange 12L in the second direction. Accordingly, the length ratio of the curved surfaces R to the inclined surface C exceeds 60% when the portions of respective curved surfaces R that extend beyond both ends of the boundary B are taken into account.

Note that the inclined surface C and the curved surfaces R are also formed at the boundary B between the second flange 12R and the winding core portion 11. The boundary B, the inclined surface C, and the curved surfaces R of the second flange 12R are arranged in point symmetry with the boundary B, the inclined surface C, and the curved surfaces R of the first flange 12L with respect to the center of the winding core portion 11.

In other words, the inclined surface C is formed so as to cover the entire length of the boundary B of the second flange 12R between the first leg 14R and the second leg 15R of the second flange 12R. In addition, the curved surface R is formed at two positions in the second direction at the boundary B of the second flange 12R with the inclined surface C interposed therebetween. Note that the second wire 32 is laid between the first leg 14R and the second leg 15R of the second flange 12R. In other words, as viewed in the first direction, the inclined surface C of the second flange 12R is disposed where the second wire 32 intersects the boundary B of the second flange 12R.

Operation of the coil component of the present embodiment will be described. Although the following description focuses on the first flange 12L, the description is applicable also to the second flange 12R.

The winding core portion 11 and the first flange 12L are connected to each other by the curved surfaces R that are curved gently. In other words, each curved surface R does not include any flat surface nor any ridge line formed by two surfaces. Accordingly, in the case of a force acting on the core 10C, the curved surfaces R disperse the load efficiently and thereby prevent the load from readily concentrating on the boundary B between the winding core portion 11 and the first flange 12L.

In addition, as illustrated in FIG. 3, the portion of the first wire 31 from the first terminal electrode 21L to the winding core portion 11 is positioned closer than the inclined surface C of the boundary B to the first end of the coil component in the first direction. In other words, the portion of the first wire 31 from the first terminal electrode 21L to the winding core portion 11 is suspended slightly over the winding core portion 11 and the first flange 12L.

As illustrated in FIG. 3, the inclined surface C has a curvature smaller than that of each curved surface R and is thereby positioned closer than the curved surface R to the first end of the coil component in the first direction. In other words, the inclined surface C is positioned closer than the curved surface R to the first wire 31. In the present embodiment, the gap between the first wire 31 and the boundary B is small compared with the case in which the curved surface R is formed in the place of the inclined surface C at the boundary B. Note that illustration of the second wire 32 is omitted in FIG. 3.

Advantageous effects of the coil component of the present embodiment will be described as follows.

(1) In the present embodiment, the curved surfaces R prevent the load from readily concentrating on the boundary B. The curved surfaces R, at which the flange 12 is connected to the winding core portion 11 by gently and smoothly curved slopes, can prevent the load concentration more effectively compared with the flat inclined surface C. Accordingly, the curved surfaces R formed at the boundary B prevent the load from readily concentrating on the boundary B between the flange 12 and the winding core portion 11, which reduces the likelihood of breakage or cracks occurring in the core 10C.

(2) In the present embodiment, the inclined surface C narrows the gap between each wire 31 or 32 and the boundary B. The narrow gap prevents foreign bodies or the like from readily entering the gap. The foreign bodies in the gap may lead to breakage of the wire 31 or 32. In the present embodiment, however, the inclined surface C narrows the gap between the wire 31 or 32 and the boundary B, which reduces the risk of wire breakage.

In the present embodiment, in the first flange 12L, the angle of the portion of the first wire 31 from the first terminal electrode 21L to the winding core portion 11 with respect to the axial direction is larger than the angle of the portion of the second wire 32 from the second terminal electrode 22L to the winding core portion 11 with respect to the axial direction. In other words, the gap between the first wire 31 and the boundary B is larger in the first flange 12L. In the present embodiment, the inclined surface C is formed where the first wire 31 crosses over the boundary B in the first flange 12L, which can efficiently reduce the risk of wire breakage. Similarly, in the second flange 12R, the inclined surface C is formed where the second wire 32 crosses over the boundary B, which can efficiently reduce the risk of wire breakage.

Coating treatment may be performed on the coil component 10, in which a coating agent is applied to the outer surfaces and solidified. In such a case, the wire 31 or 32 may break when the coating agent plugs the gap between the wire and boundary B and contracts during solidification or expands due to temperature change. In the present embodiment, the inclined surface C reduces the gap between the wire 31 or 32 and the boundary B, which reduces the likelihood of the coating agent entering and plugging the gap and the likelihood of the coating agent breaking the wire 31 or 32.

(3) In the present embodiment, the inclined surface C is formed so as to cover the entire length of the boundary B between the first leg 14 and the second leg 15. In the present embodiment, the wire 31 or 32 is likely to pass between the first leg 14 and the second leg 15 in spite of more or less deviation. In other words, the wire 31 or 32 is most likely to pass over the inclined surface C at the boundary B even if the position of the wire 31 or 32 is deviated, for example, due to deviation of the lead-out position of the wire from the winding core portion 11.

(4) The wires 31 and 32 pass near the second leg 15 in the route of the wires 31 and 32 from the winding core portion 11 to the first and second terminal electrodes 21 and 22. If the second leg 15 is shaped like a rectangular prism, the wire 31 or 32 may come into contact with, and may be short-circuited with, one of the edges of the second leg 15 that is positioned closer both to the winding core portion 11 in the axial direction and to the axis of the winding core portion 11 in the second direction.

In the present embodiment, as viewed in the first direction, the rectangular second leg 15 has the chamfered corner that is positioned closer both to the winding core portion 11 in the axial direction and to the axis of the winding core portion 11 in the second direction. The chamfered corner portion of the second leg 15 is such that the distance between the first leg 14 and the second leg 15 in the second direction becomes larger as the distance from the winding core portion 11 becomes smaller. This provides a spacing between the wire 31 or 32 and the second leg 15, which reduces the likelihood of the wire 31 or 32 coming into contact with the second leg 15.

(5) In the present embodiment, the curved surfaces R are formed at respective end portions of the boundary B in the second direction. Both ends of the boundary B in the second direction, which are crossroads between the winding core portion 11 and the boundary B in the axial direction, are vulnerable to load concentration. Forming the curved surfaces R at respective end portions of the boundary B in the second direction can alleviate stress concentration at portions vulnerable to the load concentration.

(6) In the present embodiment, the length ratio of the curved surface R to the boundary B is greater than the length ratio of the inclined surface C to the boundary B. As described above, the curved surface R disperses the load more efficiently than the inclined surface C. Providing more curved surfaces R leads to an increase in the overall strength of the coil component 10.

The coil component of the present embodiment may be modified as follows. The present embodiment and the following modification examples may be combined with one another insofar as such a combination is technically feasible.

In the above embodiment, the shape of the winding core portion 11 is not limited to the example described. For example, the winding core portion 11 may be shaped like a circular column or a polygonal prism other than the rectangular prism.

In the above embodiment, the shapes of the first leg 14 and the second leg 15 are not limited to the examples described. For example, the first opposing surface 14A and the second opposing surfaces 15A are formed so as to be parallel to each other in their entire lengths. The shapes of the first leg 14 and the second leg 15 as viewed in the first direction are not limited to be substantially rectangular but may be like squares, trapezoids, or circles.

In the above embodiment, the coil component 10 may include only one wire. In the case of the coil component 10 including the first wire 31 only, it is sufficient to form a single terminal electrode at each flange 12.

In the above embodiment, the flange 12 need not have the recess 13. Even if the flange 12 does not have the recess 13, in other words, the flange 12 does not have the first leg 14 and the second leg 15, the first wire 31 and the second wire 32 can be wound around the winding core portion 11 if the first terminal electrode 21 and the second terminal electrode 22 are formed at the flange 12 with a space interposed therebetween.

In the above embodiment, the shapes and the material of the first terminal electrode 21 and the second terminal electrode 22 are not limited to the examples described. For example, the plating material of the first terminal electrode 21 and the second terminal electrode 22 may be copper, tin, or a nickel alloy, or these materials may be laminated into multiple layers. Moreover, the first terminal electrode 21 and the second terminal electrode 22 may be mounted on the flange 12. In addition, each terminal electrode 21 or 22 may cover only part of the end surface of each leg 14 or 15 instead of covering the entire surface.

In the above embodiment, there may be a portion of the boundary B at which any of the inclined surface C and the curved surface R is not formed. In other words, there may be a portion of the boundary B at which the outer surface of the flange 12 orthogonally intersects the peripheral surface of the winding core portion 11.

In the above embodiment, the inclined surface C is formed so as to cover part of the boundary B between the first leg 14 and the second leg 15 in the second direction. Moreover, the inclined surface C need not be formed between the first leg 14 and the second leg 15 if the shape of the core 10C is such that any of the wires 31 and 32 does not pass between the first leg 14 and the second leg 15.

In the above embodiment, the wires 31 and 32 may be in contact with the inclined surface C. For example, the edge of the inclined surface C near the first end of the coil component in the first direction may be disposed at the same position as the surface positions of the first and second legs 14 and 15 near the first end of the coil component in the first direction, and the wire 31 or 32 may extend along the inclined surface C.

In the above embodiment, the inclined surface C may be formed where the second wire 32 intersects the boundary B when the first end of the coil component is viewed in the first direction. In other words, in the case of the coil component including multiple wires, it is sufficient to form the inclined surface C where at least one of the multiple wires intersects the boundary B.

In the above embodiment, the curved surfaces R need not be formed at respective end portions of the boundary B in the second direction. For example, the curved surface R may be formed at only one of the end portions, or the inclined surfaces C may be formed at respective end portions of the boundary B.

In the above embodiment, the length ratio of the inclined surface C to the boundary B may be larger than the length ratio of the curved surface R to the boundary B in the second direction. In this case, it is preferable, for example, to form the curved surface R at the boundary between the flange 12 and a peripheral surface of the winding core portion 11 that is positioned closer to the second end of the coil component in the first direction, which thereby increases the overall strength of the core 10C.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core having a columnar winding core portion and a flange at an end of the winding core portion in an axial direction that is a direction extending along an axis of the winding core portion;

a terminal electrode at an end surface of the flange, the end surface being positioned closer to a first end of the coil component in a first direction than a second end of the coil component in the first direction, the first direction being a direction extending perpendicular to the axial direction; and a wire wound around the winding core portion and having one end portion coupled to the terminal electrode, wherein the flange protrudes so as to be closer than the winding core portion to the first end of the coil component in the first direction, a curved surface and an inclined surface are at a boundary between a surface of the flange and a peripheral surface of the winding core portion that is positioned closer to the first end of the coil component in the first direction than the second end of the coil component in the first direction, the curved surface being arcuately recessed outward in the axial direction and also toward the second end of the coil component in the first direction, and the inclined surface having a curvature smaller than that of the curved surface, the inclined surface is disposed where the wire intersects the boundary as viewed in the first direction, a first distance along a second direction from the inclined surface to the boundary is greater than a second distance along the second direction from the inclined surface to the boundary, the first distance being a distance along the second direction between a first end of the boundary and a distal end of the inclined surface closest to the first end of the boundary, the second distance being a distance along the second direction between a second end of the boundary and a distal end of the inclined surface closest to the second end of the boundary, and the second direction is a direction that orthogonally intersects any of the axial direction and the first direction.

2. The coil component according to claim 1, wherein the flange has a first leg and a second leg, both of which protruding so as to be closer than the winding core portion to the first end of the coil component in the first direction, the terminal electrode includes a first terminal electrode at the first leg and a second terminal electrode at the second leg, the first leg and the second leg are spaced from each other in the second direction, the wire extends from the winding core portion to the first terminal electrode so as to pass between the first leg and the second leg, and the inclined surface is along the boundary so as to extend between the first leg and the second leg.

3. The coil component according to claim 2, wherein at least in a portion of the first leg and in a portion of the second leg, a distance between the first leg and the second leg in the second direction becomes larger as a distance from the winding core portion in the axial direction becomes smaller.

4. The coil component according to claim 2, wherein the wire extends to the first terminal electrode from a portion of the winding core portion that is positioned closer than the axis of the winding core portion to the second terminal electrode, the first leg has a first opposing surface that opposes the second leg in the second direction, the second leg has a second opposing surface that opposes the first leg in the second direction, the first opposing surface extends in the axial direction, and a portion of the second opposing surface from an edge thereof positioned near the winding core portion becomes more distant from the first opposing surface as a distance from the winding core portion in the axial direction becomes smaller.

5. The coil component according to claim 1, wherein the curved surface is at least one end portion of the boundary in the second direction.

6. The coil component according to claim 1, wherein a length ratio of the curved surface to the boundary in the second direction is equal to or more than a length ratio of the inclined surface to the boundary in the second direction.

7. The coil component according to claim 3, wherein the wire extends to the first terminal electrode from a portion of the winding core portion that is positioned closer than the axis of the winding core portion to the second terminal electrode, the first leg has a first opposing surface that opposes the second leg in the second direction, the second leg has a second opposing surface that opposes the first leg in the second direction, the first opposing surface extends in the axial direction, and a portion of the second opposing surface from an edge thereof positioned near the winding core portion becomes more distant from the first opposing surface as a distance from the winding core portion in the axial direction becomes smaller.

8. The coil component according to claim 2, wherein the curved surface is at least one end portion of the boundary in the second direction.

9. The coil component according to claim 3, wherein the curved surface is at least one end portion of the boundary in the second direction.

10. The coil component according to claim 4, wherein the curved surface is at least one end portion of the boundary in the second direction.

11. The coil component according to claim 7, wherein the curved surface is at least one end portion of the boundary in the second direction.

12. The coil component according to claim 2, wherein a length ratio of the curved surface to the boundary in the second direction is equal to or more than a length ratio of the inclined surface to the boundary in the second direction.

13. The coil component according to claim 3, wherein a length ratio of the curved surface to the boundary in the second direction is equal to or more than a length ratio of the inclined surface to the boundary in the second direction.

14. The coil component according to claim 4, wherein a length ratio of the curved surface to the boundary in the second direction is equal to or more than a length ratio of the inclined surface to the boundary in the second direction.

15. The coil component according to claim 5, wherein a length ratio of the curved surface to the boundary in the second direction is equal to or more than a length ratio of the inclined surface to the boundary in the second direction.

16. The coil component according to claim 7, wherein a length ratio of the curved surface to the boundary in the second direction is equal to or more than a length ratio of the inclined surface to the boundary in the second direction.

17. The coil component according to claim 8, wherein a length ratio of the curved surface to the boundary in the second direction is equal to or more than a length ratio of the inclined surface to the boundary in the second direction.

18. The coil component according to claim 9, wherein a length ratio of the curved surface to the boundary in the second direction is equal to or more than a length ratio of the inclined surface to the boundary in the second direction.

19. The coil component according to claim 10, wherein a length ratio of the curved surface to the boundary in the second direction is equal to or more than a length ratio of the inclined surface to the boundary in the second direction.

20. The coil component according to claim 11, wherein a length ratio of the curved surface to the boundary in the second direction is equal to or more than a length ratio of the inclined surface to the boundary in the second direction.

* * * * *